United States Patent

[11] 3,578,281

| [72] | Inventors | James C. Nielsen<br>Charleston, S.C.;<br>John J. Turner, Amsterdam, N.Y. |
|---|---|---|
| [21] | Appl. No. | 11,201 |
| [22] | Filed | Feb. 13, 1970 |
| [45] | Patented | May 11, 1971 |
| [73] | Assignee | General Electric Company |

[54] PRECISION ALIGNMENT FIXTURE
3 Claims, 3 Drawing Figs.

[52] U.S. Cl...................................................... 248/346,
308/9
[51] Int. Cl. ................................................... F16m 13/00
[50] Field of Search........................................... 248/349,
346; 308/9; 73/71.6; 180/115

[56] References Cited
UNITED STATES PATENTS

| 2,784,357 | 3/1957 | Sangster........................ | 248/346X |
| 3,208,270 | 9/1965 | Hill............................... | 73/71.6 |
| 3,253,665 | 5/1966 | Schienle....................... | 180/115 |
| 3,273,727 | 9/1966 | Rogers......................... | 214/16 |
| 3,277,696 | 10/1966 | Gertel........................... | 73/71.6 |
| 3,310,980 | 3/1967 | VonPragenau............... | 92/60 |
| 3,376,764 | 4/1968 | Schardt........................ | 77/64 |
| 3,451,731 | 6/1969 | Weichsel..................... | 308/9 |

FOREIGN PATENTS

| 1,000,934 | 2/1952 | France......................... | 248/349 |

*Primary Examiner*—Chancellor E. Harris
*Attorneys*—William C. Crutcher, Frank L. Neuhauser, Oscar B. Waddell, Joseph B. Forman and Bryan C. Ogden ABSTRACT: A precision alignment fixture which has a base member and a floating disc between which is situated a pad of grease is described and may be utilized to align heavy workpieces to close tolerances. An O-ring is situated between the base member and floating disc in order to prevent leakage of the grease. The greasing system is of the type which utilizes a spring, ball, and pin together with a feedback arrangement for shutting off the flow of grease. Jack bolts are provided to instigate and control the horizontal aligning movements of the floating disc in any direction.

Patented May 11, 1971
3,578,281
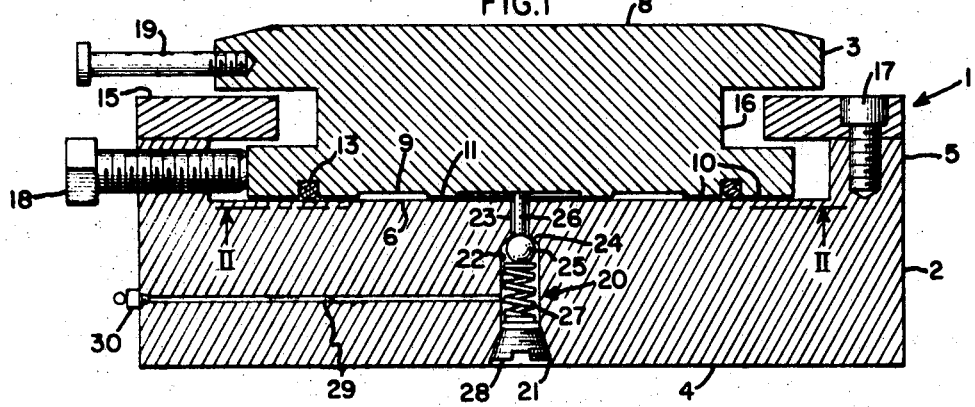
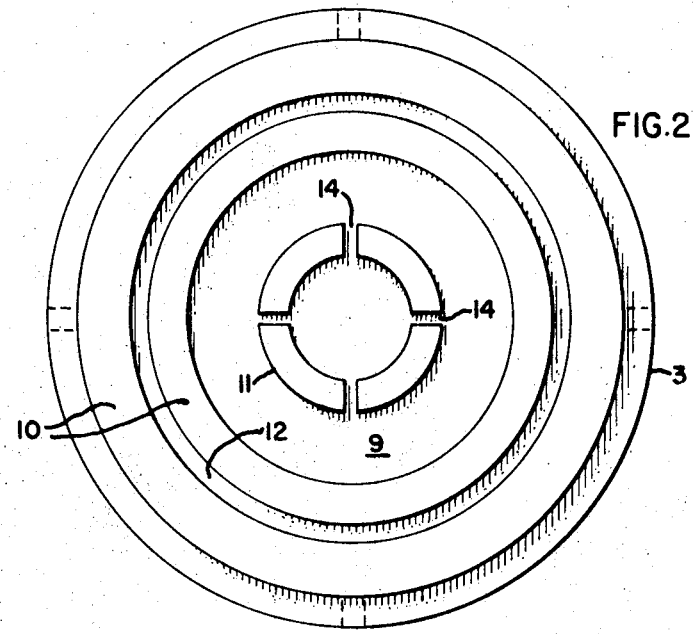
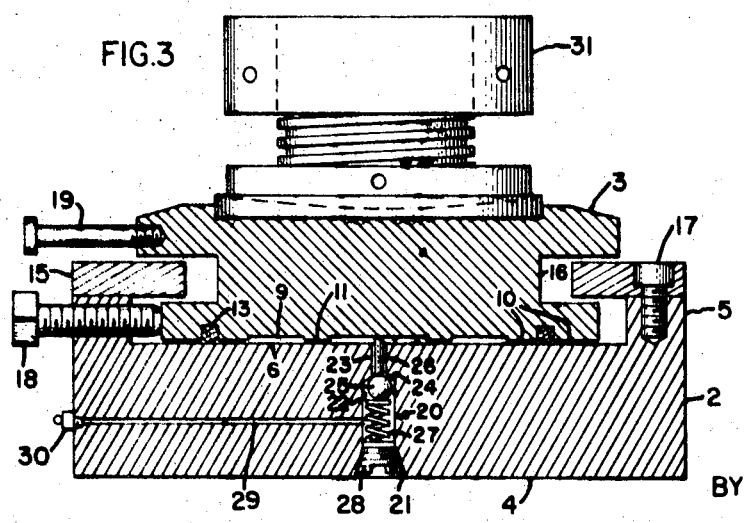
INVENTORS:
JOHN J. TURNER,
JAMES C. NIELSEN,
BY Bryan C. Ogden
THEIR ATTORNEY.

PRECISION ALIGNMENT FIXTURE

The present invention relates to a device which is used to align heavy pieces of apparatus. More particularly, it relates to an alignment fixture which is capable of positioning heavy equipment to close tolerances in a horizontal plane.

As the size of today's assembled equipment becomes larger and larger in weight and size, there is correspondingly a need for alignment fixtures capable of handling the increase in size. This is particularly evident in the manufacture of large steam turbines wherein the assembly of the various parts is required to be done in such a manner that close tolerances are required. The usual procedure for assembling large turbine parts is to initially set them on a foundation or erection stand using overhead cranes which can position the parts to plus or minus one-sixteenth of an inch of their final location. Following a variety of position checks, it is then desirable to refine the position in a horizontal plane to within 0.001 of the desired location before finally joining the parts together.

Since large steam turbines are assembled at their point of installation, it is desirable to have an alignment fixture not only capable of handling the heavy weights, but also portable. It has been suggested to use a hydrostatic lift pad utilizing hydraulic oil between the bearing surfaces. It was found that this required a complicated hydraulic system and it was not sufficiently portable. Other suggestions in the prior art were air pads and rollers and bearings which were also unacceptable in that the final design could not meet requirements of portability, capacity and accuracy. The present invention utilizes the hydrostatic principle but the hydraulic oil system has been replaced by a pad of grease and a seal is provided to eliminate leakage. This results in a portable, inexpensive and easy to operate precision alignment fixture.

Accordingly, from the foregoing, one object of the present invention is to provide an alignment fixture which operates within close tolerances.

Another object is to provide an alignment fixture which may be utilized in factory erection and field erection.

Still a further object is to provide an alignment fixture which is portable and easy to operate.

SUMMARY OF THE INVENTION

Briefly stated, the present invention is practiced in one form by having a base member with sidewalls for the reception therein of a movable floating disc. An O-ring seal is positioned between the base and floating disc such that when grease is forced into the space between the base and disc, leakage is effectively prevented. Jack bolts are mounted on the base to effect the aligning movements of the floating disc.

DRAWING

Other objects, advantages and features of the present invention will become apparent from the following description of one embodiment thereof when taken in connection with the accompanying drawing, in which:

FIG. 1 is a elevation view of the present invention.

FIG. 2 is a view taken along lines II–II of FIG. 1 (looking upward) showing a plan view of the bottom side of the floating disc.

FIG. 3 is a view of the present invention showing an additional leveling jack for adjustable height.

DESCRIPTION OF THE INVENTION

Referring now to FIG. 1, the readily portable precision alignment fixture is generally indicated at 1. The overall dimensions of the precision alignment fixture 1 are on the order of 12 inches in diameter by 6 inches high, thus making it readily portable to the site where alignment is desired. Alignment fixture 1 is comprised of base member 2 and floating disc member 3. Base member 2 is a piece of substantial mass and of high strength capable of supporting weights on the order of 50—60 tons; these figures are cited by way of example only, and should not be taken as limiting facts. The bottom side 4 of base member 2 is the surface which communicates with the ground and through which the entire weight of the workpiece is transmitted to ground. Extending upwardly from the sides of base member 2 is an annular wall 5. Wall 5 is of sufficient thickness for the acceptance of bolts which will be more fully described subsequently. The annular wall 5 surrounds the bearing surface 6 of the base member 2. It is on bearing surface 6 which the floating disc 3 is movable.

Floating disc 3 is also a material of substantial mass and strength. Its dimensions are such that it is positioned within the annular wall 5 and is juxtaposed to bearing surface 6. The top side 8 of floating disc 3 is the surface on which the workpiece may be placed. In an alternate embodiment of the present invention, the top side 8 may support a leveling jack as will be described later. The bottom side 9 of floating disc 3 is the surface which is juxtaposed to bearing surface 6. Bottom side 9 has a raised out circumferential ring 10 and a raised inner circumferential 11. The outer circumferential ring 10 is interrupted by a circumferential groove 12 into which an O-ring 13 is positioned for a sealing effect. In referring to FIG. 2, it will be seen that the inner circumferential ring 11 has slots 14 machined therefrom. Slots 14 provide a more uniform distribution of grease between bearing surface 6 and bottom side 9 that will be more fully understood when referring to the description of the operation.

Attached to the top surface of the annular wall 5 is annular ring 15. The annular ring 15 extends in a radial direction inwardly from the wall 5 and it may be split to provide for disassembly. A circumferential guide way 16 is machined from floating disc 3 such that the guide way 16 mutually cooperates with the annular ring 15, thereby forming a retaining relationship between the base member 2 and floating disc 3. The annular ring 15 is held in place by circumferentially distributed bolts 17 although only one is indicated in FIG. 1. In order to properly position the workpiece during operation, it is assumed that base member 2 is stationary, while the floating disc 3 is movable on a grease pad. The desired movements of floating disc 3 are instigated at the turning of jack bolt 18. Bolt 18 extends through the annular wall 5 and makes contact with a portion of the floating disc 3. An indicator pin 19 may be positioned on the floating disc 3 in order to properly determine the amount of movement of the floating disc 3 relative to the associated workpiece.

Turning to a description of the greasing system generally indicated at 20, it will be seen that greasing system 20 employs a form of mechanical feedback control.

A generally vertical hole indicated at 21 extends through base member 2 at or near the geometrical center. The hole 21 is comprised of a middle passage 22 which tapers into the pin passage 23. Tapered sides 24 are provided for the accommodation of the ball 25. A pin 26 extends through the pin passage 23 of hole 21 and extends a short distance into the space provided between the bottom side 9 of floating disc 3 and the bearing surface 6 of base member 2. The inner circumferential ring 11 creates this small clearance. Positioned in the middle passage 22 of hole 21 is a spring 27 which is placed below ball 25. A pipe plug 28 is inserted at the bottom of hole 21 and thus forms a sealed relationship. A grease line 29 leads into the middle passage 22 of hole 21. Any suitable hydraulic fitting 30 is provided at the other end of grease line 29.

Referring to FIG. 3, wherein like numbers represent like elements, it will be appreciated that to achieve a vertical adjustment, a suitable leveling jack 31 may be positioned on the top side 8 of the floating disc 3. A suitable indentation may be provided on the top side 8 of floating disc 3 in order to insure that a nonmovable relationship exists between the floating disc 3 and leveling jack 31.

OPERATION OF THE INVENTION

The operation of the invention will now be described. At the point of use, and before greasing the fixture, the base member 3 should be firmly situated to ground. The jack bolts 18 are unscrewed to a point where the floating disc is relatively free to move. At this point, the inner and outer circumferential rings on the bottom side of the floating disc are touching the bearing surface of the base member. In this position, the pin 26 in the greasing system is depressed and as it is depressed, the ball 25 also moves downward to form a path for the grease as it is forced through line 29 and up into the clearance between floating disc 3 and base member 2. Any standard grease gun is attached to the end of grease line 29 and grease is forced into hole 21 from where it flows upward and through the pin passage of the hole and into the clearance as aforementioned. As the grease builds up in the clearance, the floating disc tends to rise while at the same time the pin is being forced up by the action of spring 27. At a certain point, the ball 25 contacts the tapered sides 24 of hole 21, thereby stopping the flow of grease. At this point, floating disc 3 is resting on a pad of grease. The hydraulic fitting is in place and an imcompressible pad of grease is formed in the clearance defined by the floating disc 3 and base member 2 and the diameter of the O-ring 13 and the hole 21. At this point, the workpiece is ready to be placed on the floating disc. Enough of the weight of the workpiece is taken by the floating disc 3 as will allow a stable condition. The jack bolts are now adjusted so as to properly align the workpiece in a horizontal plane.

It will thus be appreciated that a readily portable, easy to operate precision alignment fixture has been described which utilizes a grease pad as a sliding surface. The addition of a leveling jack may be used to increase the vertical adjustment as desired.

We claim:

1. A precision alignment fixture for positioning heavy apparatus, comprising:
   a base member having a sidewall extending upwardly and a top side bearing surface, thusly forming a receptacle,
   a movable member having at least one raised portion on its bottom side and juxtaposed against said bearing surface in the receptacle of said base,
   a greasing system for providing a pad of grease between said bearing surface and said floating member bottom side, such that said floating member is movable laterally with respect to said base,
   sealing means disposed between said base and said floating member such that the pad of grease is contained in a grease tight relationship,
   means to position said floating member to the desired position.

2. An alignment fixture according to claim 1 in which the greasing system is comprised of a spring, ball, and pin arrangement whereby a mechanical feedback effect is created to control the flow of grease between the bearing surface and the floating member bottom side.

3. An alignment fixture according to claim 1 in which the positioning means are comprised of a plurality of bolts extending through the sidewall and contacting the movable member.